(12) United States Patent
Travis

(10) Patent No.: US 6,409,051 B1
(45) Date of Patent: Jun. 25, 2002

(54) METHOD AND APPARATUS FOR DISPENSING A FLUID MEDIA

(75) Inventor: Glenn W. Travis, Sunnyvale, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 09/675,085

(22) Filed: Sep. 28, 2000

(51) Int. Cl.⁷ .................................................. G01F 11/00
(52) U.S. Cl. ...................................... 222/219; 222/218
(58) Field of Search ................................. 282/218, 219

(56) References Cited

U.S. PATENT DOCUMENTS

| | | | | |
|---|---|---|---|---|
| 2,427,680 A | * | 9/1947 | Leonard ........................ | 184/7 |
| 3,125,136 A | * | 3/1964 | Miller et al. ................. | 141/369 |
| 3,323,687 A | * | 6/1967 | Thornhill ...................... | 222/219 |
| 3,561,727 A | * | 2/1971 | Domer ......................... | 251/172 |
| 5,456,298 A | * | 10/1995 | Tennis ......................... | 141/156 |
| 5,547,110 A | * | 8/1996 | Keller et al. ................. | 222/219 |
| 5,575,706 A | * | 11/1996 | Tsai et al. ..................... | 451/41 |
| 5,779,520 A | * | 7/1998 | Hayakawa .................... | 451/41 |
| 5,857,893 A | * | 1/1999 | Olsen et al. .................. | 451/5 |
| 5,966,765 A | * | 10/1999 | Hamada et al. .............. | 15/77 |
| 5,966,766 A | * | 10/1999 | Shipley et al. ............... | 15/102 |
| 6,099,662 A | * | 8/2000 | Wang et al. .................. | 134/26 |

* cited by examiner

*Primary Examiner*—Henry C. Yuen
*Assistant Examiner*—Frederick C. Nicolas
(74) *Attorney, Agent, or Firm*—Martine & Penilla, LLP

(57) ABSTRACT

An apparatus for dispensing media is provided. The apparatus has a rotating element having a cylindrical bore with a first end and a second end where the rotating element rotates the first end and the second end. The apparatus also includes a housing which has a fixed input port and a fixed output port where the housing encloses the rotating element. The first end and the second end of the rotating element intermittently switches between being aligned with the fixed input port and the fixed output port and being aligned with the fixed output port and the fixed input port, respectively. The apparatus also has a cylindrical piston contained within the cylindrical bore where the cylindrical piston has a length that is less than the cylindrical bore and switches from being closer to the fixed input port and the fixed output port.

20 Claims, 13 Drawing Sheets

METHOD AND APPARATUS FOR DISPENSING A FLUID MEDIA

BACKGROUND OF THE INVENTION

1. Field of the Invention

The present invention relates to dispensing all forms of media and, more particularly, to the efficient and accurate dispensing of fluid media in wafer processing applications.

2. Description of the Related Art

In the semiconductor chip fabrication process, it is well-known that there is a need to dispense different types of media such as liquid, semi-solid, and sometimes solid substances in various operations. For example, semiconductor wafer fabrication, polishing, and cleaning operations require precise and controlled amounts of media to be applied to a wafer. Examples of such operations include chemical mechanical polishing (CMP) and wafer cleaning. In CMP, a wafer is placed in a holder which pushes a wafer surface against a circulating belt pad or rotary pad table. The circulating belt pad as well as the rotary pad table uses a slurry which consists of chemicals and abrasive materials which facilitate the polishing. Therefore, a mechanism is typically used to dispense slurry onto the pad to effectuate polishing of the wafer.

Once wafers are polished, the wafers are processed through cleaning operations. Media is then dispensed from one or more media delivery mechanisms of a cleaning system to clean the wafer of contaminants accumulated during fabrication and polishing operations. In one example, in a cleaning operation, there is a desire to have a particular chemical such as HF, DI water, ammonia, and the like applied very precisely to a wafer to enact a particular cleaning operation. Therefore, there is a desire in the high technology field for a precise device to deliver media in very specific quantities. To do this, a complex combination of factors may need to be precisely controlled.

Unfortunately delivery systems used in wafer processing operations such as CMP and wafer cleaning tend to use various apparatuses such as valves in addition to various regulators and controls to deliver the desired amount of media onto the wafer or wafer cleaning station (e.g., such as to a brush). Such mechanisms are utilized in an attempt to achieve a particular flow rate, flow amounts, or a particular fluid pressure. Once these mechanisms are put into place, these systems will require detailed calibrations by skilled professionals to make them work as intended for a particular process. Such calibrations include adjusting the timing sequence of media application, the pressure of the fluid flow, the use of shut off valves, the regulating of fluid flow, the adjusting of diameters of flow tubes, and the like. These factors may be highly critical to making the processing conditions optimal for wafer production and processing.

Because these adjustments and calibrations are detailed, problems may arise if such calibrations are not done properly. Even if the calibrations and adjustments are done satisfactorily at the initial setup, over time the system will have to continually be maintained to ensure that the desired performance is maintained to ensure consistency in wafer cleaning from wafer lot to wafer lot. As can be appreciated, the time taken for such detailed setup and continual adjustments can be prohibitive for efficient or high throughput wafer production that demands consistency and repeatability over long term production cycles.

In addition, factors such as controlled application time spans and start and stop cycles must be carefully regulated during use in order to dispense the right amount of media. As can be seen, numerous complex combination of factors may need to be optimized for the proper application of media to a wafer in, for example, a wafer fabrication processes. Most importantly, a variation of a single factor may change flow rates dramatically, and many times necessitates that highly skilled personnel spend an excessive amount of time fine-tuning prior art media dispensing devices. As a result, there is a desire to have less complex but precise systems that enable the application of different types of media, and in particular for use in the wafer processing industry.

Therefore, there is a need for a method and an apparatus that overcomes the problems of the prior art by enabling easily configurable, adjustable, and highly accurate media dispensing.

SUMMARY OF THE INVENTION

Broadly speaking, the present invention fills these needs by providing a method and apparatus for efficiently and accurately dispensing media in a variety of different applications. It should be appreciated that the present invention can be implemented in numerous ways, including as a process, an apparatus, a system, a device or a method. Several inventive embodiments of the present invention are described below.

In one embodiment, an apparatus for dispensing media is provided. The apparatus has a rotating element having a cylindrical bore with a first end and a second end where the rotating element rotates the first end and the second end. The apparatus also includes a housing which has a fixed input port and a fixed output port where the housing encloses the rotating element. In this embodiment, the first end and the second end of the rotating element intermittently switches between being aligned with the fixed input port and the fixed output port and being aligned with the fixed output port and the fixed input port, respectively. The apparatus also has a cylindrical piston contained within the cylindrical bore where the cylindrical piston has a length that is less than the cylindrical bore and switches from being closer to the fixed input port and the fixed output port.

In another embodiment, a method for dispensing media is provided. The method receives a first fixed quantity of media at an input. Then the first fixed quantity of media is rotated to an output. Thereafter, a second fixed quantity of media is received at the input and substantially simultaneously the first fixed quantity of media at the output is dispensed.

In yet another embodiment, a fluid dispenser to be used in wafer processing operations is provided. The fluid dispenser includes a rotating element which has a cylindrical bore with a first end and a second end where the rotating element rotates the first end and the second end. The fluid dispenser also includes a housing which has a fixed input port and a fixed output port where the housing encloses the rotating element. The first end and the second end of the rotating element intermittently switches between being aligned with the fixed input port and the fixed output port and being aligned with the fixed output port and the fixed input port, respectively. The fluid dispenser also has a cylindrical piston contained within the cylindrical bore where the cylindrical piston has a length that is less than the cylindrical bore and switches from being closer to the fixed input port and the fixed output port. In this embodiment, the cylindrical bore of the fluid dispenser receives a fluid from the fixed input port as the cylindrical piston moves toward the fixed output port and simultaneously dispenses the fluid from the fixed output port.

The advantages of the present invention are numerous. Most notably, by creating an apparatus and method to efficiently and accurately dispense media, wafer processing operations such as, for example, CMP and wafer cleaning processes may be conducted without concerns about over-application or under-application of media. Compared to the prior art, the present invention is a reliable and accurate dispensing device which has only three principal components. Therefore, the present invention is less complicated than generally available commercial dispensing devices. In addition, the present invention may be actuated by any variety of motivating devices which affects and controls rotary motion. This makes the present invention highly flexible to use. The present invention also has the advantage of using line pressure as a principal means of actuating the dispensing motion. This again assists in the enablement of consistent and accurate media application.

Furthermore, the volume of media dispensed can also be changed easily while exact repeatable volumes may be dispensed with each dispensing cycle. In addition to the accurate delivery of media, the present invention may also vary the cyclic dispensing rate. Therefore, the present invention has numerous features which enable accurate and dependable dispensing of media.

Other aspects and advantages of the present invention will become apparent from the following detailed description, taken in conjunction with the accompanying drawings, illustrating by way of example the principles of the present invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

An invention for a method and apparatus for efficiently and accurately dispensing media is disclosed. In the following description, numerous specific details are set forth in order to provide a thorough understanding of the present invention. It will be understood, however, by one of ordinary skill in the art, that the present invention may be practiced without some or all of these specific details. In other instances, well known process operations have not been described in detail in order not to unnecessarily obscure the present invention.

In general terms, the apparatus and method described herein refer to a mechanism that allows intermittent dispensing of media is in predetermined quantities. The media can also be dispensed as a continuous flow if intermittently applied at fast enough rates. A media dispensing apparatus as described below includes three basic components: a housing, a rotating element, and a free floating piston. The free floating piston is contained in a cylindrical bore inside of the rotating element. The rotating element is contained in a housing with diametrically opposed inlet and outlet ports. The apparatus and method of dispensing media does so in an accurate and efficient manner thus obviating the need for media regulators such as valves, etc.

Figure 1:
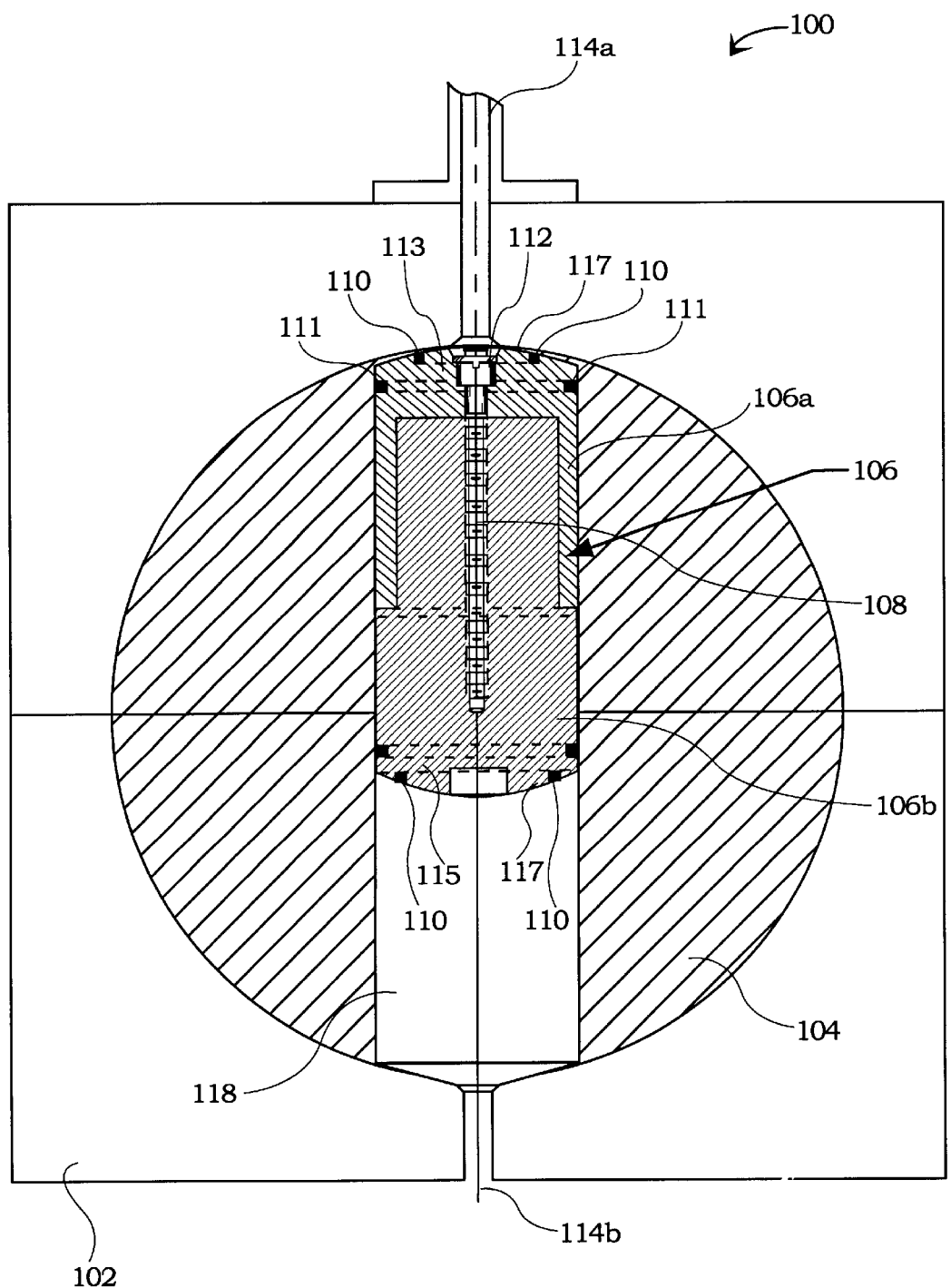
FIG. 1 shows a media dispensing apparatus in accordance with one embodiment of the present invention.

FIG. 1 shows a media dispensing apparatus 100 in accordance with one embodiment of the present invention. In this embodiment, a free floating piston 106 is located inside of a cylindrical bore 118. The free floating piston 106 is an oblong cylindrical object and may be made out of any material as long as the material is not reactive to the media used. The cylindrical bore 118 defines a cylindrical space configured within a rotating element 104. The rotating element 104 is contained within a housing 102. An intake port 114a and an exhaust port 114b is located at a top and bottom portions respectively of the housing 102. The free floating piston 106 is composed of two sections; a receptacle half 106a and an insertion half 106b which is connected together by an adjustable screw 108. The free floating piston 106 also has a top end 113 and a bottom end 115. A semi-spherically shaped end surface 117 exists on both of the ends 113 and 115 of the free floating piston 106. An O-ring 110 is located at each of the top end 113 and the bottom end 115 of the free floating piston 106 while an O-ring 111 is attached to the side of the free floating piston 106 near each of the ends 113 and 115.

In one embodiment, a media is introduced into the cylindrical bore 118 by way of the intake port 114a. The intake port 114a may also be referred to as an input port or an inlet port. The O-rings 110 and 111 prevent leakage of the media by allowing the free floating piston to form a seal with the surfaces which defines the cylindrical bore 118 of the rotating element 114. It should be appreciated that the apparatus 100 may be designed and constructed by finite control of tolerances and may be made without any O-rings, especially in free floating pistons with diameters as small as, for example, ⅛ inch.

Figures 2A, 2B:
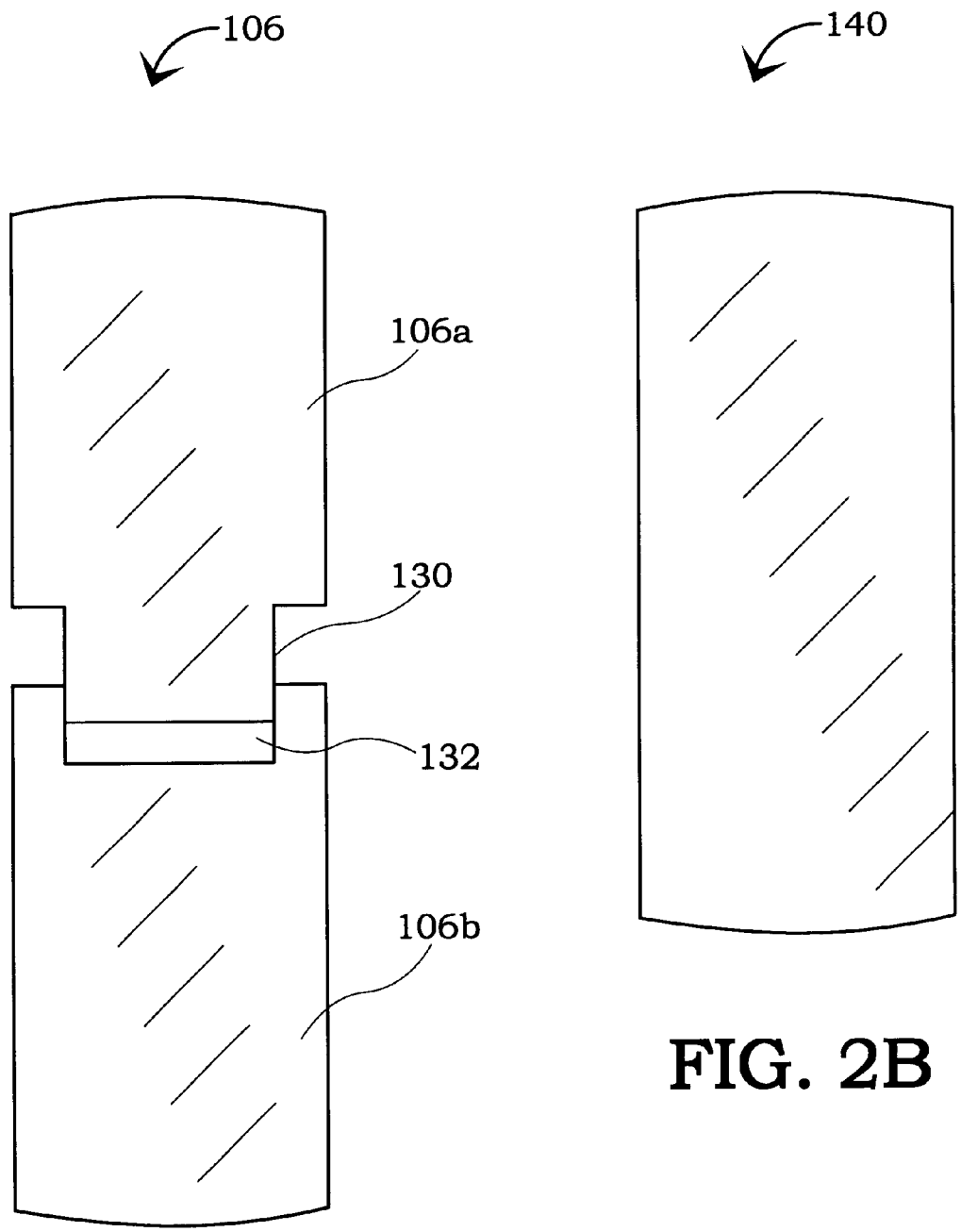
FIG. 2A shows a free floating piston in accordance with one embodiment of the present invention.
FIG. 2B shows a fixed length free floating piston in accordance with one embodiment of the present invention.

In one embodiment, the free floating piston 106 may be made shorter or longer by use of the adjustable screw 108. In one embodiment, a screw driver may be utilized to rotate the adjustable screw 108 to either lengthen or shorten the free floating piston 106 by separating or joining the receptacle half 106a and the insertion half 106b. In another embodiment, the receptacle half 106a is counter-bored and has a snap ring 112 to accommodate the adjustment screw 108. It should be appreciated that the free floating piston 106 may be configured in any way which would allow the length to be modified. As described more fully below, by changing the volume of the free floating piston 106, the volume of media dispensed may be adjusted. It should be understood that the free floating piston 106 may be a singular unit with a fixed length (as show in FIG. 2B below) and volume, or the free floating piston 106 (as also shown in FIG. 2A below) may be adjustable in length and volume as in the presently described embodiment.

In yet another embodiment, in order to have the same volume on either end of the free floating piston 106, the insertion half 106b has a corresponding cylindrical bore 118 equal to the remaining volume of the cylindrical bore 118 in the receptacle half 116a not occupied by the adjustment screw and the snap ring 112.

Because the free floating piston 106 exists within the cylindrical bore 118 of the rotating element 104, when media is inputted into a top portion of the cylindrical bore 118, the free floating piston 106 is pushed down the cylindrical bore 118. After this process, the volume above the free floating piston 106 and within the cylindrical bore 118 is filled with media. By adjusting the volume of the free floating piston as described above, the amount of media which may enter the cylindrical bore 118 and which may then be dispensed is changed.

In one embodiment, the free floating piston 106 has a length that is shorter than one half the length of the cylindrical bore 118. In this case, when the free floating piston 106 is pushed down the cylindrical bore 118, more media may flow into a top portion of the cylindrical bore 118 because the free floating piston 106 takes up less volume within the cylindrical bore 118. Conversely, in another embodiment, the free floating piston 106 may have a length that is longer than one half the length of the cylindrical bore 118. In this case, the free floating piston 106 is not moved down as much in the chamber when the media is introduced into the cylindrical bore 118. Therefore, less media may exist in the cylindrical bore 118 at any one time because the free floating piston 106 takes up more volume within the cylindrical bore 118. It should be appreciated that the free floating piston 106 may be made any size that is shorter than the cylindrical bore 118. In addition, it should also be realized that the cylindrical bore 118 may also be made any size. Therefore, with the use of the present invention, any amount of media may be dispensed by varying either or both of the free floating piston 106 and the cylindrical bore 118.

In one embodiment, after the media has be en introduced into the media dispensing apparatus 100, the rotating element 104 is rotated 180 degrees in a semicircular movement which places the free floating piston 106 at the top portion of the cylindrical bore 118, and the media previously inputted into the cylindrical bore 118 is located at a bottom portion of the housing 102. At this point, additional media is inserted into the cylindrical bore 118 by way of the intake port 114a. When this occurs, the free floating piston 106 is pushed down the cylindrical bore 118 by the additional media. When the free floating piston 106 is pushed down the cylindrical bore 118, the media existing below the free floating piston 106 is forced out of cylindrical bore 118 and the housing 102 through the exhaust port 114b. The exhaust port 114b may also be referred to as an outlet port or an output port. The method of inserting and dispensing media by the device is discussed in more detail in reference to FIGS. 5A to 5E. It should also be appreciated that various configurations of the present inventions may be made such as, for example, having a valve attached to the exhaust port 114b. Because the volume of the cylindrical bore 118 and the free floating piston 106 may be fixed, a specific amount of media may be dispensed from this apparatus. Therefore, the present invention may be utilized to enable efficient, yet accurate media dispensing without the need for detailed and complex calibrations.

FIG. 2A shows a free floating piston 106 in accordance with one embodiment of the present invention. In this embodiment, the free floating piston 106 is composed of two different parts, an insertion half 106a and a receptacle half 106b. The insertion half 106a has an insertion section 130 which fits into a receptacle section 132 of the receptacle half 106b. By adjusting the amount of insertion of the insertion half 106a into the receptacle half 106b (by for example an adjustable screw as shown in FIG. 1), the total volume of the adjustable free floating piston 106 may be varied. By varying the volume of the adjustable free floating piston, the amount of media dispensed by the device of the present invention may be altered. This varying occurs because when the free floating piston 106 is smaller, more media may be inserted into the cylindrical bore 118 as described in FIG. 1. This happens because more volume will exist above the adjustable free floating piston 106 in cylindrical bore 118 when media pushes the adjustable free floating piston 106 all the way down the cylindrical bore 118. Therefore, through the use of only one free floating piston 106, amounts of media dispensed may be accurately modified.

FIG. 2B shows a fixed length free floating piston 140 in accordance with one embodiment of the present invention. In this embodiment, the fixed length free floating piston 140 is not adjustable and is only one piece. Therefore, the fixed length free floating piston 140 allows one amount of volume to be dispensed per rotating cycle in a particular size cylindrical bore. In one embodiment, a rotating cycle may be described as the introduction of media into the cylindrical bore 118 (of FIG. 1) to the dispensing of the media after the rotating element 104 (of FIG. 1) has been turned 180 degrees as discussed in further detail in reference to FIGS. 5A to 5E. It should be appreciated that the fixed length free floating piston 140 may be any length depending on the desired volume of media to be dispensed. In addition, different fixed length free floating pistons 140 with different volumes may be utilized to increase or decrease the amount of media dispensed.

Figure 3A:
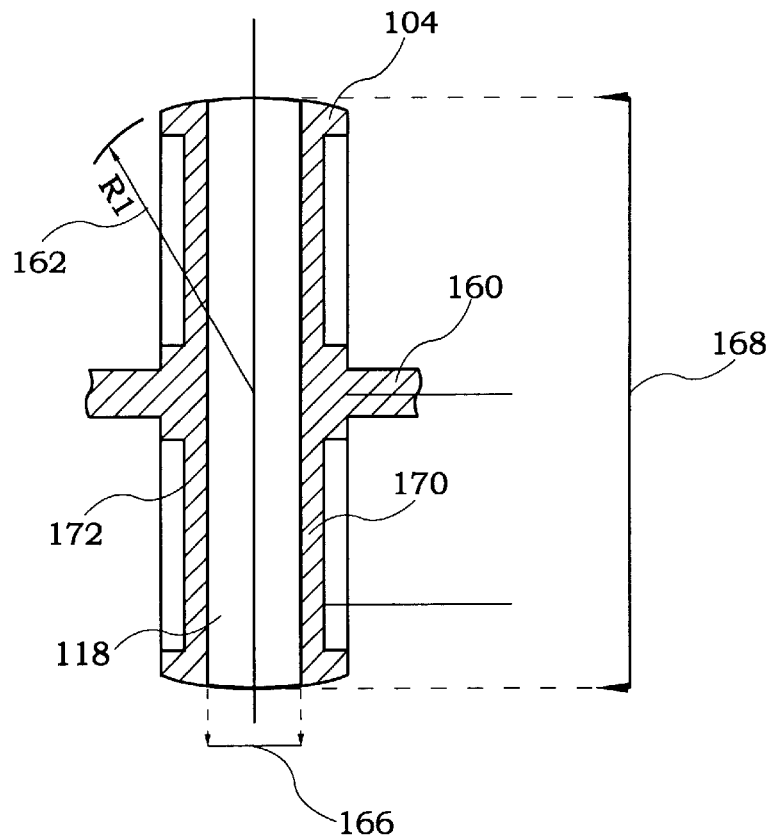
FIG. 3A shows a side view of a rotating element in accordance with one embodiment of the present invention.

FIG. 3A shows a side view of a rotating element 104 in accordance with one embodiment of the present invention.

In this embodiment, the rotating element 104 has a rotating chuck 160 attached to a center portion of a front surface 170 and a back surface 172 of the rotating element 104. The cylindrical bore 118 is defined within the rotating element 104. The rotating element 104 is a circular structure and has a radius 162. The size of the rotating element 104 is shown by a diameter 168 and a width 166.

In one embodiment, the rotating element 104 resides in a housing structure such as housing 102 (as shown in FIG. 1) and contains a free floating piston 106 (as shown in FIG. 1). As media is introduced into the rotating element 104, the free floating piston 106 moves up and down the cylindrical bore 118. By making the radius 162 and the diameter 168 larger, the volume of the cylindrical bore 118 may be made larger (or by making the diameter 168 smaller, the volume can be made smaller). It should be understood that the cylindrical bore 118 may be made of any size depending on the size of the free floating piston 106 and the amount of media desired to be dispensed per cyclical rotation of the rotating element 104.

Figure 3B:
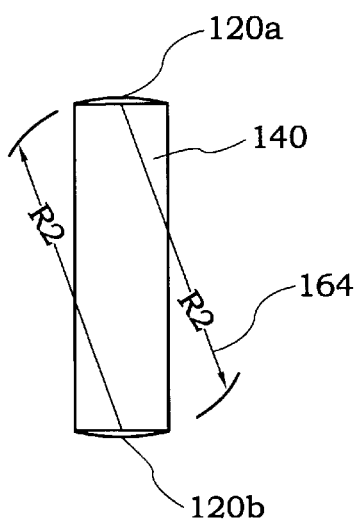
FIG. 3B shows a fixed length free floating piston in accordance with one embodiment of the present invention.

FIG. 3B shows a fixed length free floating piston 140 in accordance with one embodiment of the present invention. In one embodiment, the fixed length free floating piston 140 has a radius R2 164 which is the nearly equal to the radius of a rotating element 104 (not shown). The fixed length free floating element 140 also has a spherical top surface 120a and a spherical bottom surface 120b. The spherical surfaces 120 are curved to form an arc that is continuous with an arc formed by an outside circle of rotating element 104. Therefore, with the O-ring 110 as shown in FIG. 1, the arc of the spherical surfaces 120 allows a seal to be formed with the rotating element 104 and the housing 102 of FIG. 1.

In one embodiment, the radius R1 162 of FIG. 3A and the radius R2 164 as discussed in reference to FIG. 3B are about equal. The radius R1 162 is a compound radius while the radius 164 is a spherical radius. This configuration enables uniform sealing in terms of compression of the O-ring 110. It should be appreciated that the radius may be any be any configuration which would allow sealing of the free floating piston 106 and the rotating element 104 and the housing 102.

Figure 3C:
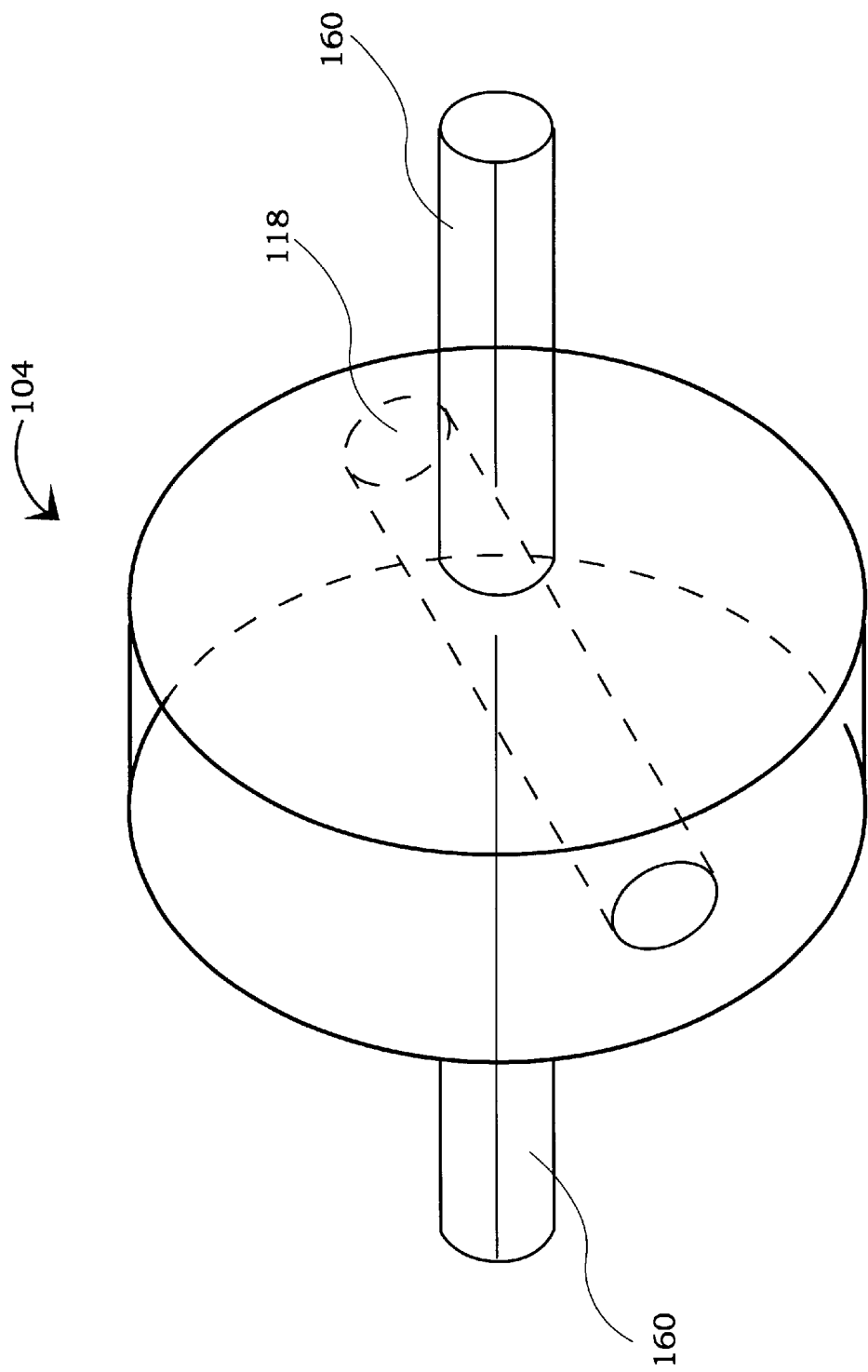
FIG. 3C shows an isometric view of a rotating element in accordance with one embodiment of the present invention.

FIG. 3C shows an isometric view of a rotating element 104 in accordance with one embodiment of the present invention. In this embodiment, the rotating element 104 has a chuck 160 which turns the rotating element in either a clockwise or a counterclockwise direction. A cylindrical bore 118 is located through the center portion of a thick disk like section of the rotating element 104. In one embodiment, the lengthwise plane of the cylindrical bore 118 is perpendicular to the lengthwise plane of the chuck 160. In use, a free floating piston 106 (shown in FIG. 1) is contained within the cylindrical bore 118 and the rotating element 104 is contained within a housing 102 (shown in FIG. 1).

Figure 4:
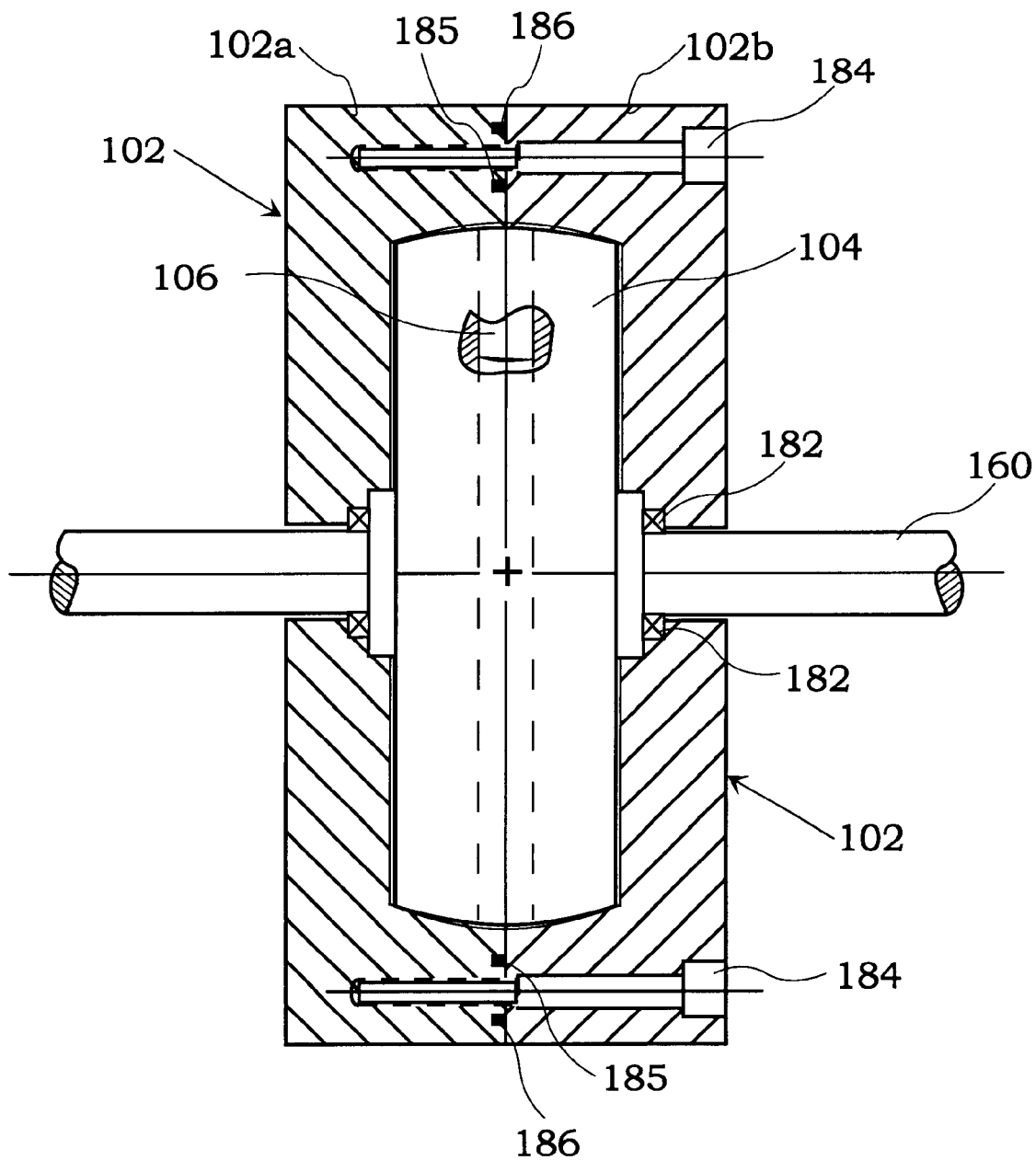
FIG. 4 shows a side view of the rotating element within a housing in accordance with one embodiment of the present invention.

FIG. 4 shows a side view of the rotating element 104 within a housing 102 in accordance with one embodiment of the present invention. In this embodiment, the housing 102 is comprised of a housing half 102a and a housing half 102b. The housing half 102a is attached to the housing half 102b by use of bolts 184 at a first end of the housing and at a second end of the housing. O-rings 185 and 186 are utilized to form a seal between the housing halves 102a and 102b thereby reducing media leakage from an interior portion of the housing 102.

The housing 102, in one embodiment, is hollow and inner space of the housing 102 is configured to contain a rotating element 104. The housing halves 102a and 102b have a circular opening in a center portion though which a chuck 160 of the rotating element 104 extrudes. In one embodiment, a direct drive motor mechanism may be attached to the chuck 160 to turn the rotating element 104. It should be appreciated that the rotating element 104 may be turned using any sort of motorized or movement initiating device, such, as for example, a stepper motor, servo motor, etc. Bearings 182 may be utilized at the junction of the chuck 160 and the housing 102 to allow the rotating element 104 to rotate within the housing 102.

Figure 5A:
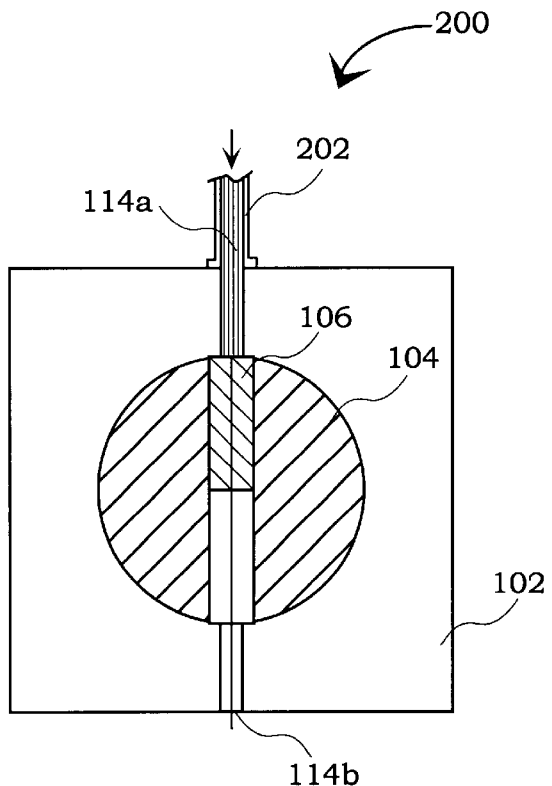
FIG. 5A illustrates a first stage in a media dispensing process in accordance with one embodiment of the present invention.

FIGS. 5A, 5B, 5C, 5D, and 5E show one cycle of a media 200. FIG. 5A illustrates a first stage in a media dispensing process 200 in accordance with one embodiment of the present invention. In this embodiment, a cylindrical bore 118 of a rotating element 104 is in line with an intake port 114a and an exhaust port 114b. The process starts with the introduction of a media 202 into a housing 102 through an intake port 114a. It should be appreciated that the media 202 may be a solid, semi-solid, or a liquid such as, for example, a cleaning fluid, etching fluid, a slurry, etc. The media 202 then travels into the cylindrical bore 118 of the rotating element 104. The media 202 then pushes against a free floating piston 106 located at the top end of the cylindrical bore 118. The free floating piston 106 is in line with the intake and exhaust ports 114a and 114b. The force of the media 202 pushes the free floating piston 106 down the cylindrical bore 118. In this way, the media 202 starts to fill up the space within the cylindrical bore 118 which is above the free floating piston 106.

Figure 5B:
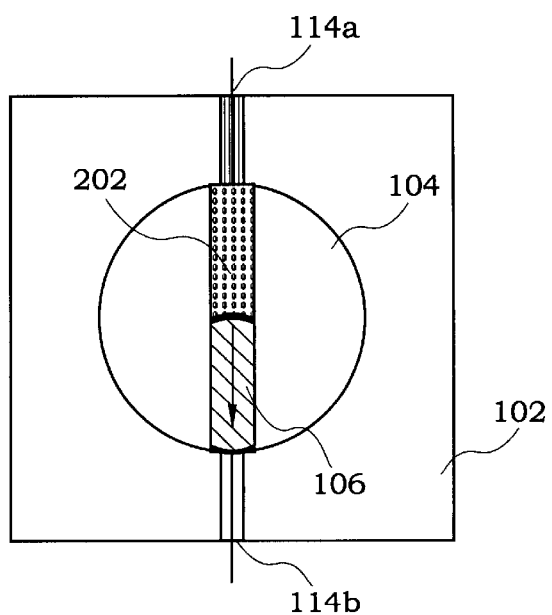
FIG. 5B illustrates a second stage in a media dispensing process in accordance with one embodiment of the present invention.

FIG. 5B illustrates a second stage in a media dispensing process 200 in accordance with one embodiment of the present invention. In this embodiment, after the media 202 pushes down on the free floating piston 106, the free floating piston 106 is pushed down until it rests against the bottom section of the rotating element 104. At this point, the media 202 has filled the volume created above by the downward movement of the free floating piston 106. The cylindrical bore 118 of a rotating element 104 is still in line with the intake port 114a and the exhaust port 114b.

Figure 5C:
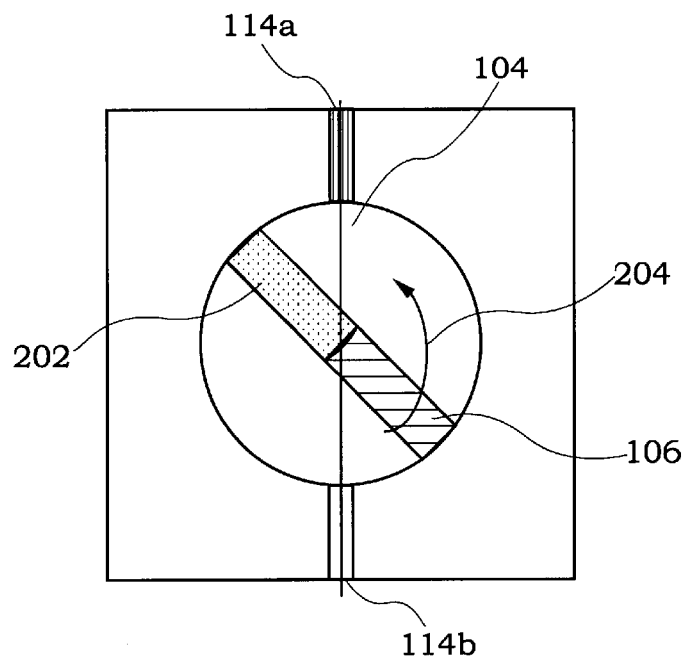
FIG. 5C illustrates a third stage in a media dispensing process in accordance with one embodiment of the present invention.

FIG. 5C illustrates a third stage in a media dispensing process 200 in accordance with one embodiment of the present invention. In this embodiment, once the media has filled the volume of the cylindrical bore 118 above the free floating piston 106, the rotating element 104 is rotated by a rotation 204. In one embodiment, the rotation 204 moves the rotating element 104 in a counterclockwise direction. It should be appreciated that the rotating element may be turned in another direction such as clockwise. It should also be appreciated that the rotating element 104 may be turned at any speed depending on the dispensing rate of the media desired. As the rotating element 104 turns, the media 202 is rotated toward the bottom of the housing 102. At this point, the cylindrical bore 118 of a rotating element 104 is not in line with the intake port 114a and the exhaust port 114b.

Figure 5D:
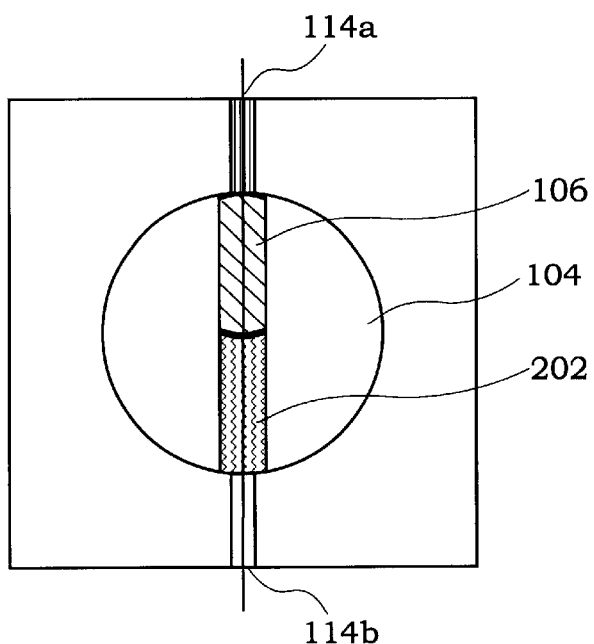
FIG. 5D shows a fourth stage in a media dispensing process in accordance with one embodiment of the present invention.

FIG. 5D shows a fourth stage in a media dispensing process 200 in accordance with one embodiment of the present invention. After the rotating element 104 completes a rotation of a 180 degrees, the free floating piston 106 and the cylindrical bore 118 is again parallel and in line with the intake port 114a and the exhaust port 114b. After the rotation, the free floating piston 106 is at the top of the cylindrical bore 118. This is the same position occupied by the free floating piston at the beginning of the cycle as referenced in FIG. 5A. After the rotation, the media 202 is at the bottom portion of the cylindrical bore 118.

Figure 5E:
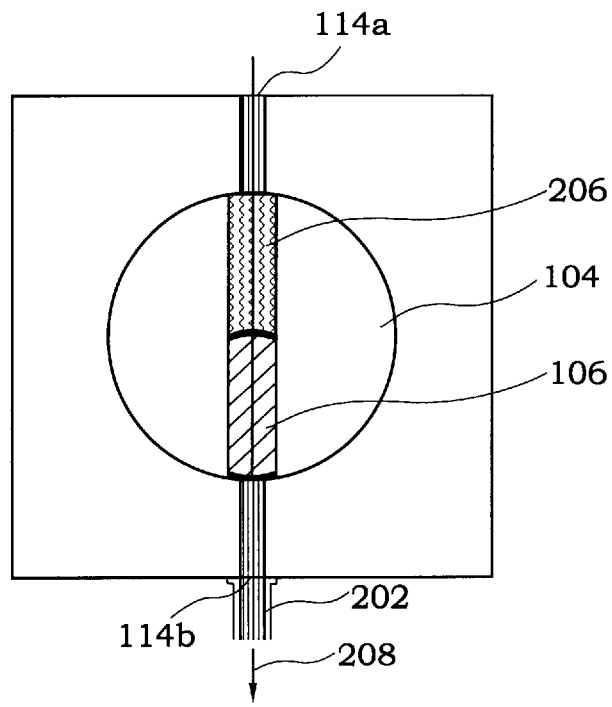
FIG. 5E shows a final stage in a media dispensing process in accordance with one embodiment of the present invention.

FIG. 5E shows a final stage in a media dispensing process 200 in accordance with one embodiment of the present invention. In this stage, additional media 206 is inputted into housing 102 through the intake port 114a. As the additional media 206 enters into the rotating element 104 from the housing 102, the free floating piston 106 is pushed down the cylindrical bore 118. As the piston 106 is pushed down, the media 202 which was at the bottom portion of the cylindrical bore 118 is pushed out of the rotating element by the free floating piston 106. By this process, the media 202 is accurately dispensed in a controlled and efficient manner out of the exhaust port 114b through outflow 208. Because the volumes of the cylindrical bore 118 and the free floating piston 106 stays constant during the media dispensing cycle, set amounts of media are expelled. It should be appreciated that any number of cycles may be completed to dispense any amount of media in any period of time. As a result, media may be measured and dispensed in an accurate manner without the need for constant modifications and calibrations.

Figure 6:
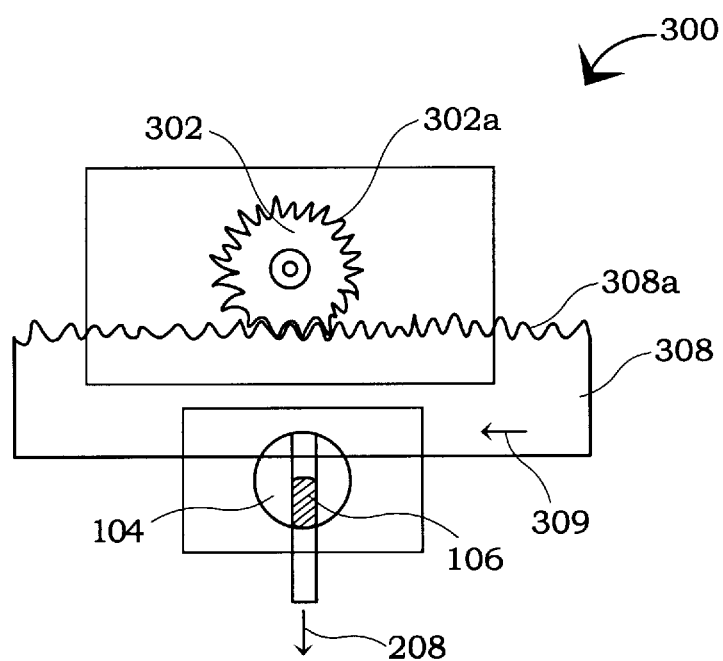
FIG. 6 shows a rack and pinion media dispensing system in accordance with one embodiment of the present invention.

FIG. 6 shows a rack and pinion media dispensing system 300 in accordance with one embodiment of the present invention. In this embodiment, a pinion 302 with gearing 302a is driven by a motor. The pinion 302, through the gearing 302a, is connected to gearing 308a of a rack 308. The rack 308 is then connected to a housing 102 containing a rotating element 104 and a free floating piston 106. As described in FIGS. 5A to 5E, the rotating element 104 is rotated to receive and dispense media. In one embodiment, the rotating element 104 is precisely turned 180 degrees in one media dispensing cycle.

In this embodiment, a rack and pinion device provides the turning mechanism required for the rotation used by the media dispensing apparatus. In one embodiment, the pinion 302 is rotated by a motor. Then, through contact of the gearing 302a and the gearing 308a, the pinion 302, by its rotation, moves the rack 308 in a lateral direction 309. In this embodiment, the rack 308 is attached to a rotating chuck 160. The lateral direction 309 then rotates the chuck 160 which in turn rotates the rotating element 104. As the rotating element 104 turns, media may be dispensed as described in FIGS. 5A to 5E.

By carefully controlling the rotations per minute of the pinion 302, the number of cycles of media dispensed may be gauged accurately. Because the amount of media dispensed per cycle is fixed, the amount of media dispensed per unit time may be adjusted by changing the rotations per unit time of the rotating element. In one embodiment, the media dispensing unit may serve to meter the dispense rate by slowing the rate of rotation as the rotating element 104 starts to enter alignment of the cylindrical bore 118 with the intake port 114a and the exhaust port 114b thereby opening passages to accept and dispense media.

It should be appreciated that many different ways may be utilized to actuate the rotating element 104 of the preset invention such as for example, a programmable servo motor with a gear reduction, a belt or chain drive in combination with a programmable servo motor, an electric motor in combination with a Geneva driver, and the like. Therefore, the present invention is extremely flexible in that any variety of methods can be used to rotate the rotating element 104 at any variety of speeds to control media output by controlling the number of dispensing cycles during any period of time.

Figure 7A:
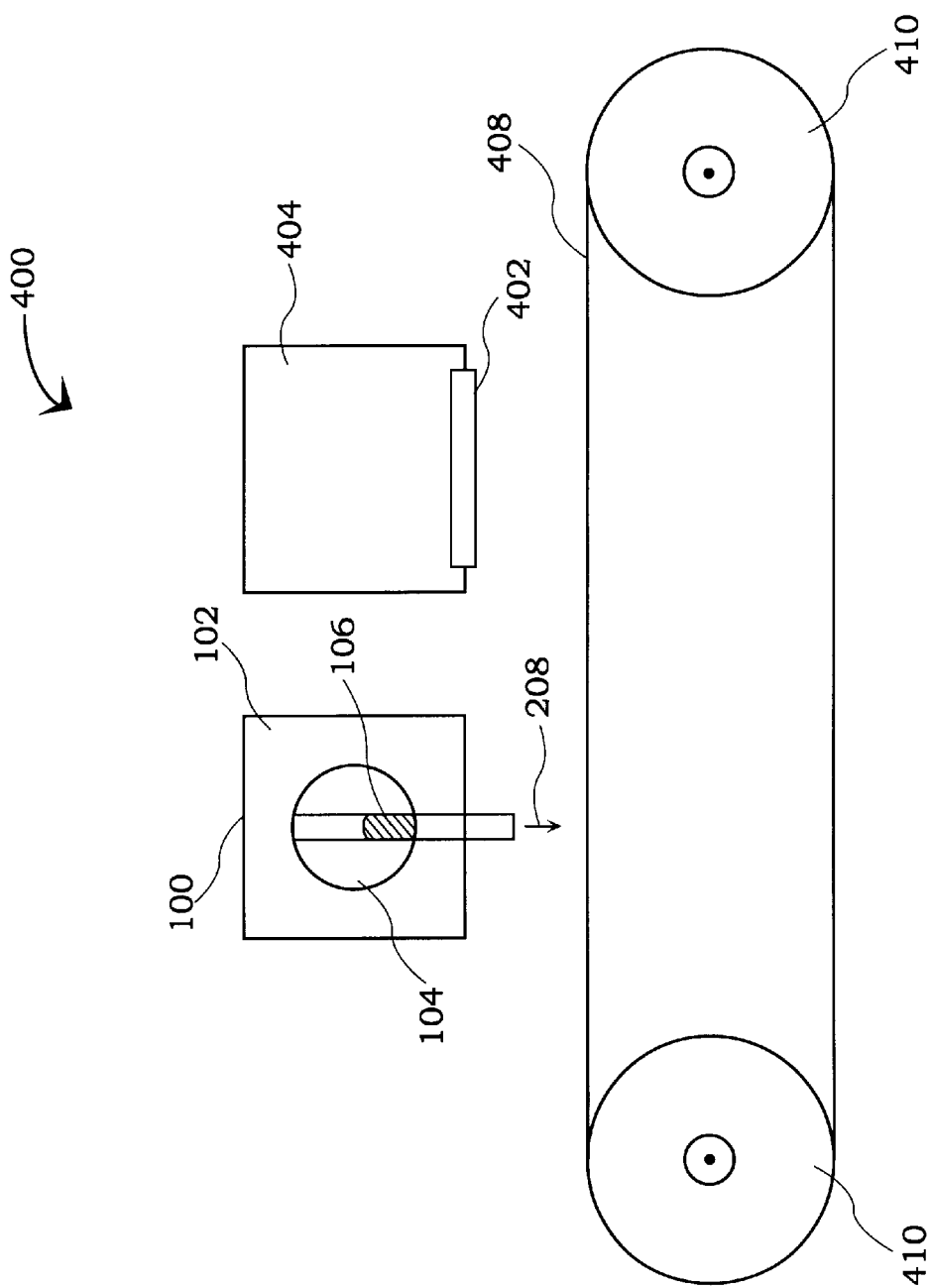
FIG. 7A shows a media dispensing apparatus used within a chemical mechanical polishing system.

FIG. 7A shows a media dispensing apparatus 100 used within a chemical mechanical polishing system 400. In this embodiment, a roller 410 moves a polishing pad belt 408. A carrier head 404 holds a wafer 402 over the polishing pad belt 408. The media dispensing apparatus 100, by the mechanism described in detail in reference to FIGS. 5A to 5E, dispenses media by outflow 208. The media dispensing apparatus 100 is shown with a free floating piston 106 and a rotating element 104 contained within a housing 102. In one embodiment, the media dispensed is a slurry typically used in chemical mechanical polishing processes. It should be appreciated that the media dispensed may be any liquid, compound, semi-solid, or solid used for wafer processing. After the media is dispensed onto the polishing pad belt 408, the wafer 402 is lowered onto the moving polishing belt 408 which is actuated by the rotation of a roller 410. In this way, the wafer 402 may be efficiently polished by use of the media dispensing apparatus 100.

Figure 7B:
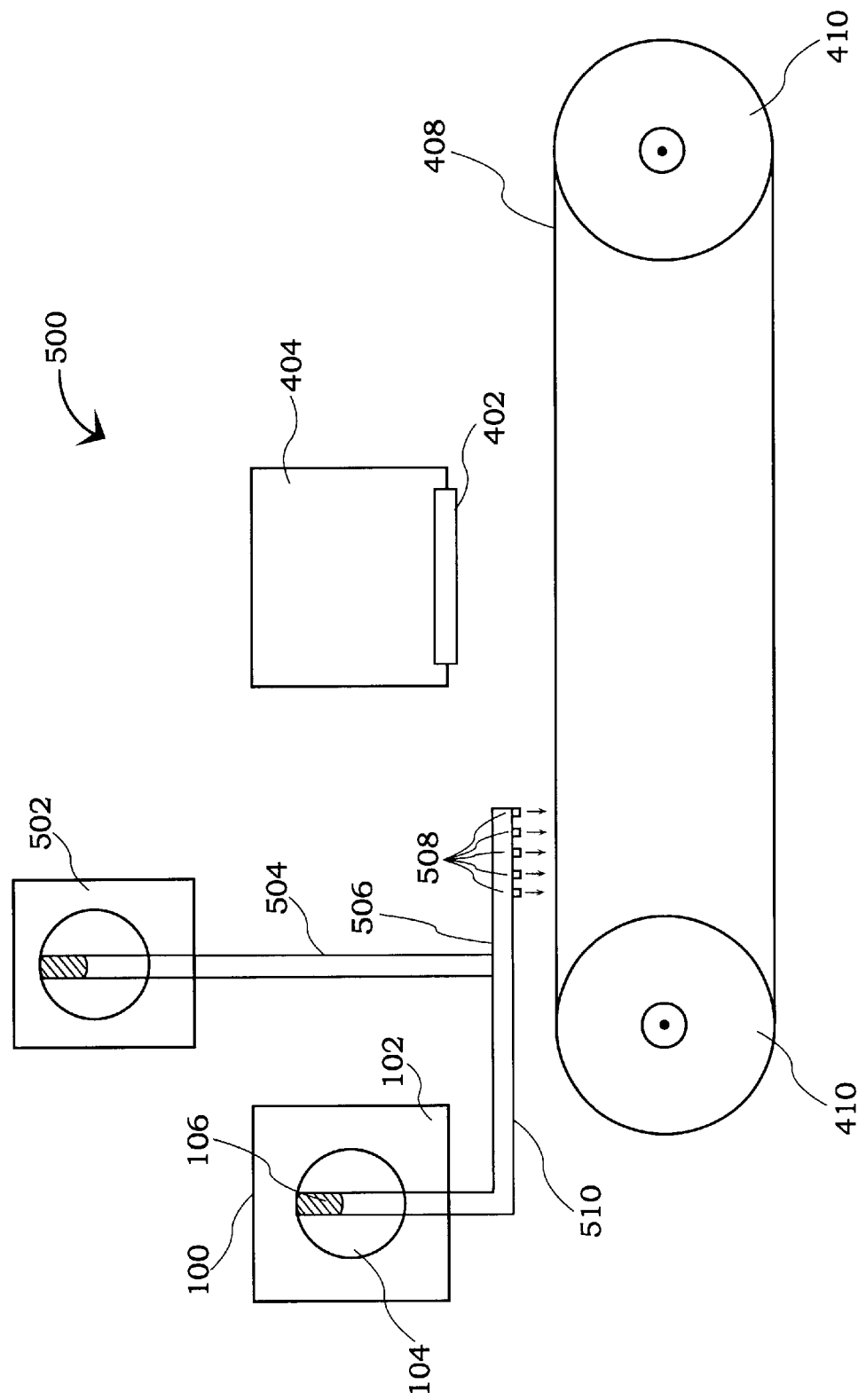
FIG. 7B shows a media dispensing apparatus remotely connected to a chemical mechanical polishing system in accordance with one embodiment of the present invention.

FIG. 7B shows a media dispensing apparatus 100 remotely connected to a chemical mechanical polishing system 500 in accordance with one embodiment of the present invention. In this embodiment, a polishing belt 408 is wrapped around a roller 410 which moves the polishing belt 408. A wafer polishing head 404 holds a wafer 402. The media dispensing apparatus 100 is shown with a free floating piston 106 and a rotating element 104 contained within a housing 102. In one embodiment, the media dispensing apparatus 100 is remotely connected to the chemical mechanical polishing system 500. It should be appreciated that the media dispensing apparatus 100 may be located anywhere as long as the dispensed media may be transported to the location of the wafer processing system.

In one embodiment of a remote media dispensing system, an output from the media dispensing apparatus 100 is connected by a tube 510 to an output of a deionized water dispenser 502 which in turn is connected to a tube 504. A combined output of the media dispensing apparatus 100 and the deionized water dispenser 502 flows through a tube 506 and is dispensed from nozzles 508. In one embodiment, the deionized water dispenser 502 is also configured in the same way as the media dispensing apparatus 100. It should be understood that although this embodiment utilizes the deionized water dispenser 502, any other type of media dispenser may be utilized, such as one dispensing, for example, polishing media. As indicated in reference to FIG. 7A, once the media is applied to the polishing belt 408, the wafer 402 is lowered onto the polishing belt 408 which polishes the wafer 402 with the use of the applied media. Again, the media dispensing apparatus 100 is so flexible that it may be utilized in any place where a tube may link the media output to a wafer processing equipment. Therefore, the media dispensing apparatus may even be located in a different room than the CMP system 500. As a result, this creates numerous solutions to space problems faced by many high technology companies.

Figure 8:
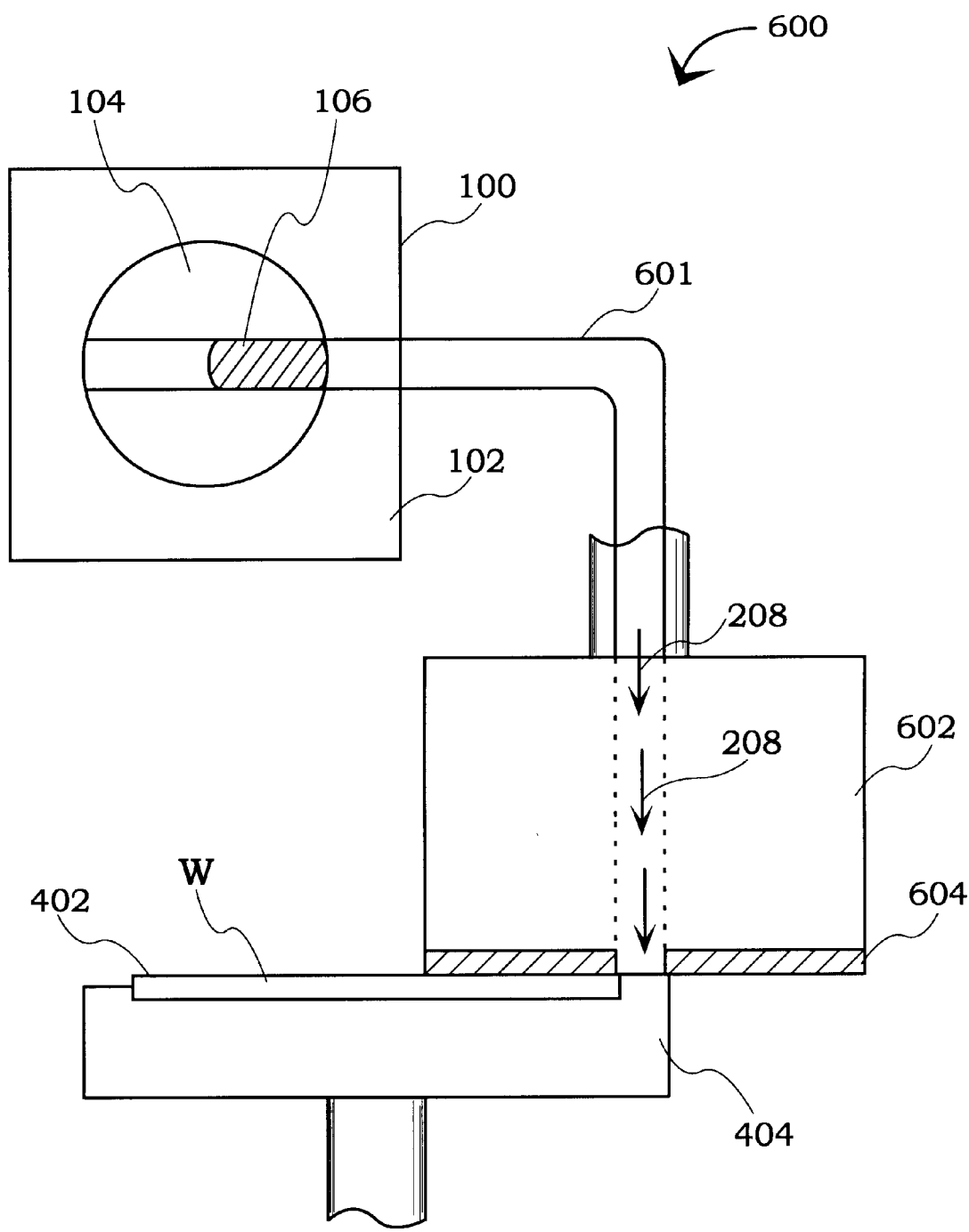
FIG. 8 shows a media dispensing apparatus used within a wafer polishing system in accordance with one embodiment of the present invention.

FIG. 8 shows a media dispensing apparatus 100 used within a wafer polishing system 600 in accordance with one embodiment of the present invention. In this embodiment, the media dispensing apparatus 100 is connected to a polishing head 602 by a tube 601. A polishing pad 604 is attached to the polishing head 602. The media dispensing apparatus 100 is shown with a free floating piston 106 and a rotating element 104 contained within a housing 102. Media from the media dispensing apparatus 100 is inputted into the polishing head 602 by the tube 601. In one embodiment, slurry is dispensed by the media dispensing apparatus 100. It should be appreciated that the media dispensing apparatus 100 may dispense any fluid, semi-solid, or solid material that may be used in wafer polishing. The polishing head 602 receives media by an outflow 208 from the media dispensing apparatus 100 and applies the media to the polishing pad 604 attached thereto. The polishing pad may then polish a wafer 402 which is held by a carrier head 404. Again, the present invention may be utilized in any wafer processing operation which requires controlled media output.

Figure 9:
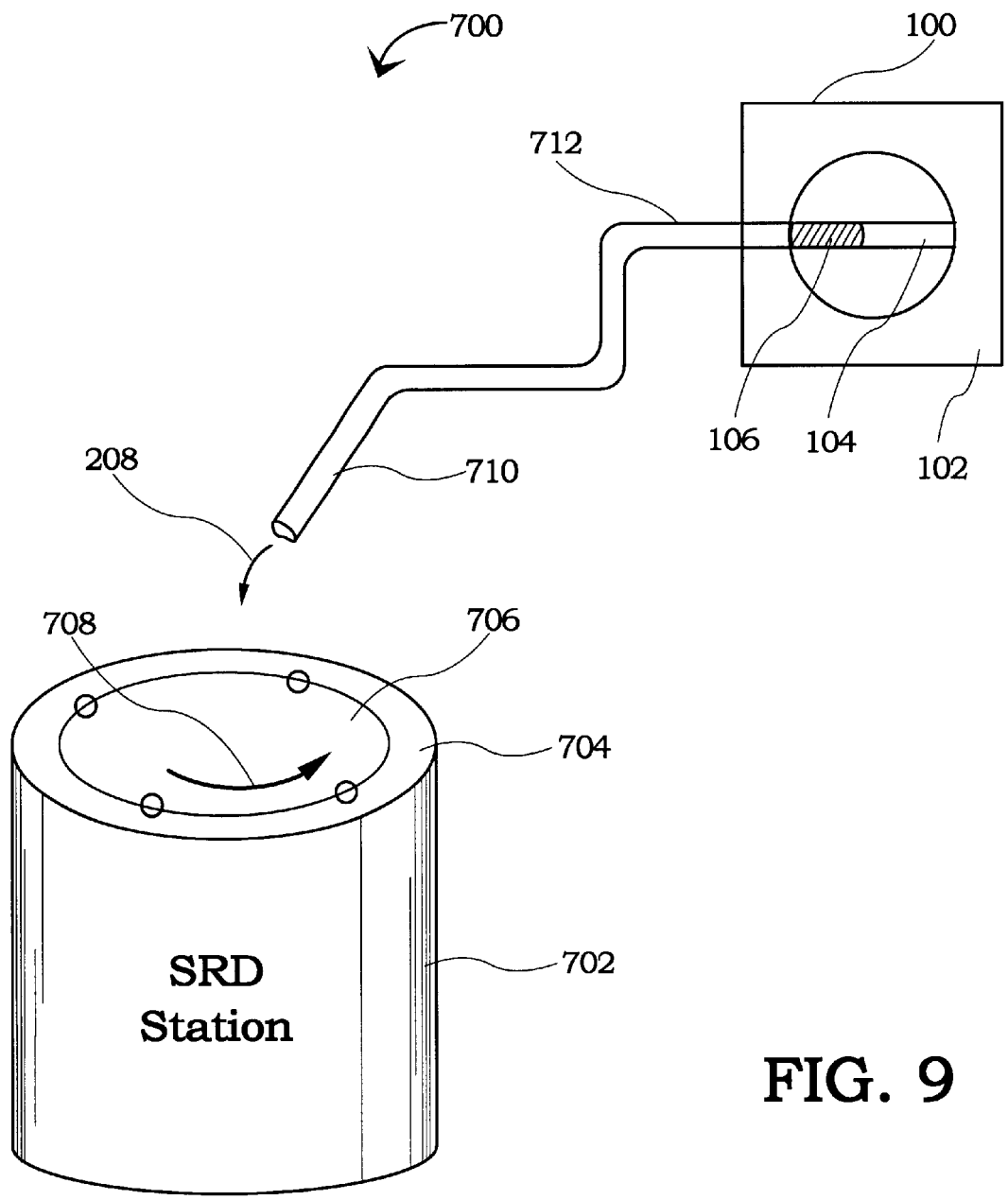
FIG. 9 shows a media dispensing apparatus used within a spin rinse and dry (SRD) system in accordance with one embodiment of the present invention.

FIG. 9 shows a media dispensing apparatus 100 used within a spin rinse and dry (SRD) system 700 in accordance with one embodiment of the present invention. In one embodiment, the media dispensing apparatus 100 is connected to a tube 712 which outputs an outflow 208 on a wafer 706 over an SRD apparatus 702. The media dispensing apparatus 100 is shown with a free floating piston 106 and a rotating element 104 contained within a housing 102. The SRD apparatus 702 has a top surface 704 on which a wafer 706 lies. The wafer 706 is rotated in a rotation 708 to remove a cleaning media from its surface. It should be appreciated that the media dispensing apparatus may utilize a variety of cleaning fluids such as, for example, DI water, HF, ammonia, etc. It should also be understood that the SRD apparatus 702 may be any type of device that cleans the wafer 706 and which uses some form of media such as for example, a liquid, a solid, a semi-solid and the like.

Figure 10:
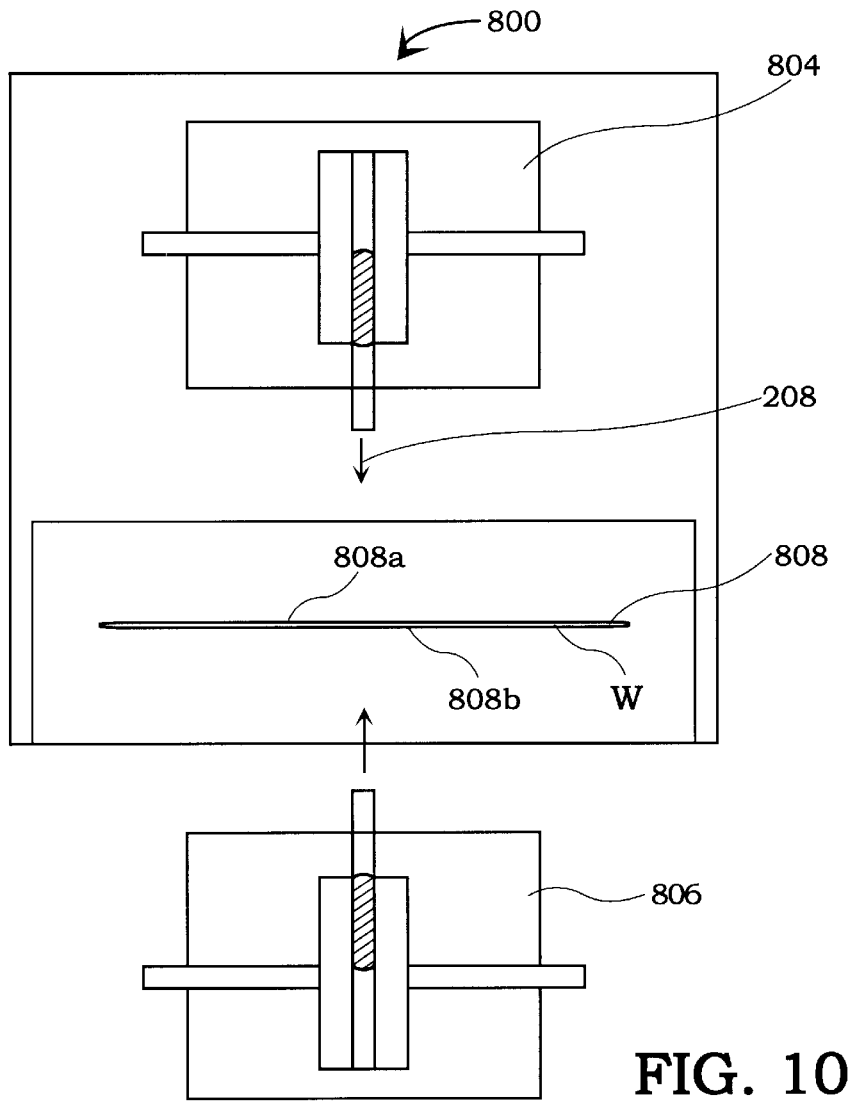
FIG. 10 shows two media dispensing apparatuses used within a wafer cleaning system in accordance with one embodiment of the present invention.

FIG. 10 shows two media dispensing apparatuses used within a wafer cleaning system 800 in accordance with one embodiment of the present invention. In one embodiment, a media dispensing apparatus 804 and a media dispensing apparatus 806 may be respectively placed above and below a wafer 808. In this way, both a top surface 808a and a bottom surface 808b of the wafer 808 may be cleaned by an outflow 208 and an outflow 806 respectively. In one embodiment, both the top surface 808a and the bottom surface 808b may be cleaned at the same time. In this embodiment, the outflow 208 and the outflow 806 may be dispensed with different outflow pressures because the outflow 806 may need more pressure to apply the same amount of media on the bottom surface 808 due to gravitational forces. Therefore, as can be seen, the present invention may be utilized in any type of wafer processing operation. In addition, it should be emphasized that the media dispensing apparatus 100 may be used in any application in any other field which may require controlled media output.

Figure 11:
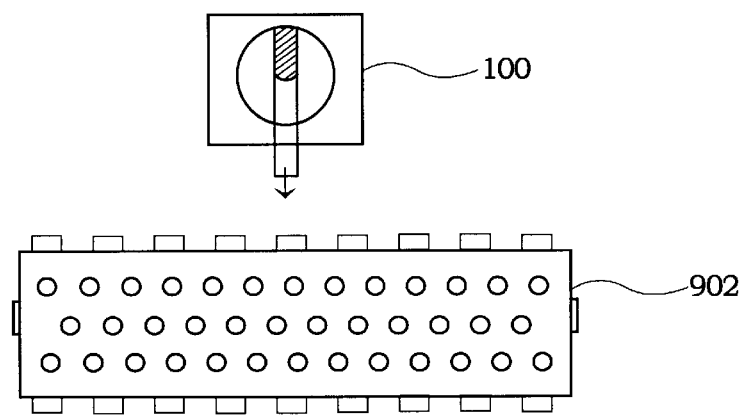
FIG. 11 illustrates a media dispensing apparatus controllably dispensing a media onto a wafer scrub brush in accordance with one embodiment of the present invention.

FIG. 11 illustrates a media dispensing apparatus 100 controllably dispensing a media onto a wafer scrub brush 902.

While this invention has been described in terms of several preferred embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. An apparatus for dispensing a liquid media, comprising:
   a rotating element having a cylindrical bore with a first end and a second end, the rotating element being disk shaped and configured to rotate the first end and the second end;
   a motorized device coupled to the rotating element;
   a housing having a fixed input port and a fixed output port, the housing being configured to enclose the rotating element, the first end and the second end of the rotating element being configured to intermittently switch between being aligned with the fixed input port and the fixed output port and being aligned with the fixed output port and the fixed input port, respectively; and
   a cylindrical piston contained within the cylindrical bore, the cylindrical piston having a length that is less than the cylindrical bore and is configured to switch from being closer to the fixed input port and the fixed output port;
   wherein the rotating element is configured to be rotated by the motorized device to provide a substantially continuous flow of the liquid media, and the apparatus is implemented for controllably dispensing the liquid media onto one of a wafer surface, a wafer scrub brush, and a CMP polishing pad.

2. An apparatus for dispensing media as recited in claim 1, wherein the cylindrical bore receives the media from the fixed input port as the cylindrical piston moves toward the fixed output port and simultaneously dispenses the media from the fixed output port.

3. An apparatus for dispensing media as recited in claim 1, wherein the cylindrical piston is adjustable.

4. An apparatus for dispensing media as recited in claim 1, wherein the cylindrical piston has a first end and a second end, each end having a semi-spherical shape.

5. An apparatus for dispensing media as recited in claim 1, wherein the intermittently switching enables flow rate control of the dispensed media.

6. An apparatus for dispensing media as recited in claim 1, further comprising:
   a chuck connected to a center point of the rotating element, the chuck being rotatably attached to the housing.

7. An apparatus for dispensing media as recited in claim 3, wherein a variable amount of media is dispensed based on a setting of the adjustable piston.

8. An apparatus for dispensing media as recited in claim 6, wherein the chuck enables rotation of the rotating element.

9. A method for dispensing liquid media, comprising:
   (a) receiving a first fixed quantity of the liquid media at an input;
   (b) rotating the first fixed quantity of the liquid media to an output; and
   (c) receiving a second fixed quantity of the liquid media at the input and substantially simultaneously dispensing the first fixed quantity of the liquid media at the output;
   repeating (a) through (c) for successive first fixed quantities and second fixed quantities of the liquid media at a set cycle rate to achieve a substantially continuous flow of the liquid media;
   dispensing the liquid media onto one of a wafer surface, a wafer scrub brush, and a CMP polishing pad.

10. A method for dispensing media as recited in claim 9, wherein the media is one of DI water, chemicals, and slurry.

11. A method for dispensing media as recited in claim 10, wherein DI water is directed onto the wafer.

12. A method for dispensing media as recited in claim 10, wherein the slurry is directed onto the pad.

13. A method for dispensing media as recited in claim 10, wherein the chemicals are directed onto the wafer scrub brush.

14. A fluid dispenser to be used in wafer processing operations, comprising:
   a rotating element having a cylindrical bore with a first end and a second end, the rotating element being disk shaped and configured to rotate the first end and the second end;
   a motorized device coupled to the rotating element;
   a housing having a fixed input port and a fixed output port, the housing being configured to enclose the rotating element, the first end and the second end of the rotating element being configured to intermittently switch between being aligned with the fixed input port and the fixed output port and being aligned with the fixed output poll and the fixed input port, respectively; and a cylindrical piston contained within the cylindrical bore, the cylindrical piston having a length that is less than the cylindrical bore and is configured to switch from being closer to the fixed input port and the fixed output port;

wherein the cylindrical bore receives a liquid fluid from the fixed input port as the cylindrical piston moves toward the fixed output port and simultaneously dispenses the liquid fluid from the fixed output port, and the rotating element is configured to be rotated by the motorized device at a set rate to provide a substantially continuous flow of the liquid fluid, and the apparatus is implemented for controllably dispensing the liquid fluid onto one of a wafer surface, a wafer scrub brush, and a CMP polishing pad.

15. A fluid dispenser to be used in wafer processing operations as recited in claim 14, wherein the cylindrical piston is adjustable.

16. A fluid dispenser to be used in wafer processing operations as recited in claim 14, wherein the cylindrical piston has a first end and a second end, each end having a semi-spherical shape.

17. A fluid dispenser to be used in wafer processing as recited in claim 14, wherein the intermittently switching enables flow rate control of the dispensed fluid.

18. A fluid dispenser to be used in wafer processing as recited in claim 14, farther comprising:

a chuck connected to a center point of the rotating element, the chuck being rotatably attached to the housing.

19. A fluid dispenser to be used in wafer processing operations as recited in claim 15, wherein a variable amount of fluid is dispensed based on a setting of the adjustable piston.

20. A fluid dispenser to be used in wafer processing as recited in claim 18, wherein the chuck enables rotation of the rotating element.

* * * * *